July 28, 1970     W. E. KAROW ETAL     3,521,949
SMALL MICROFILM READER
Filed Sept. 21, 1967     2 Sheets-Sheet 1
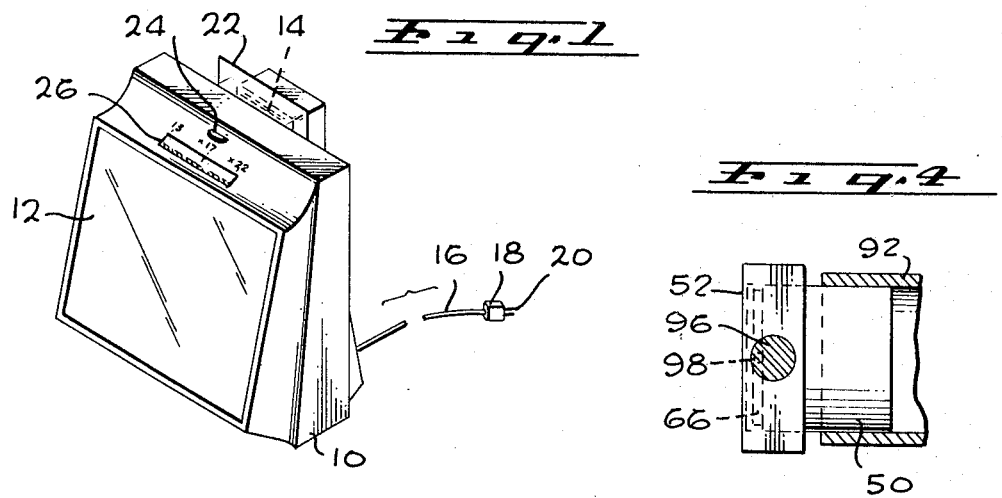
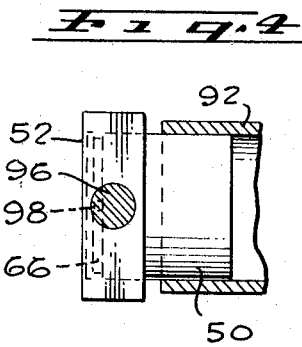
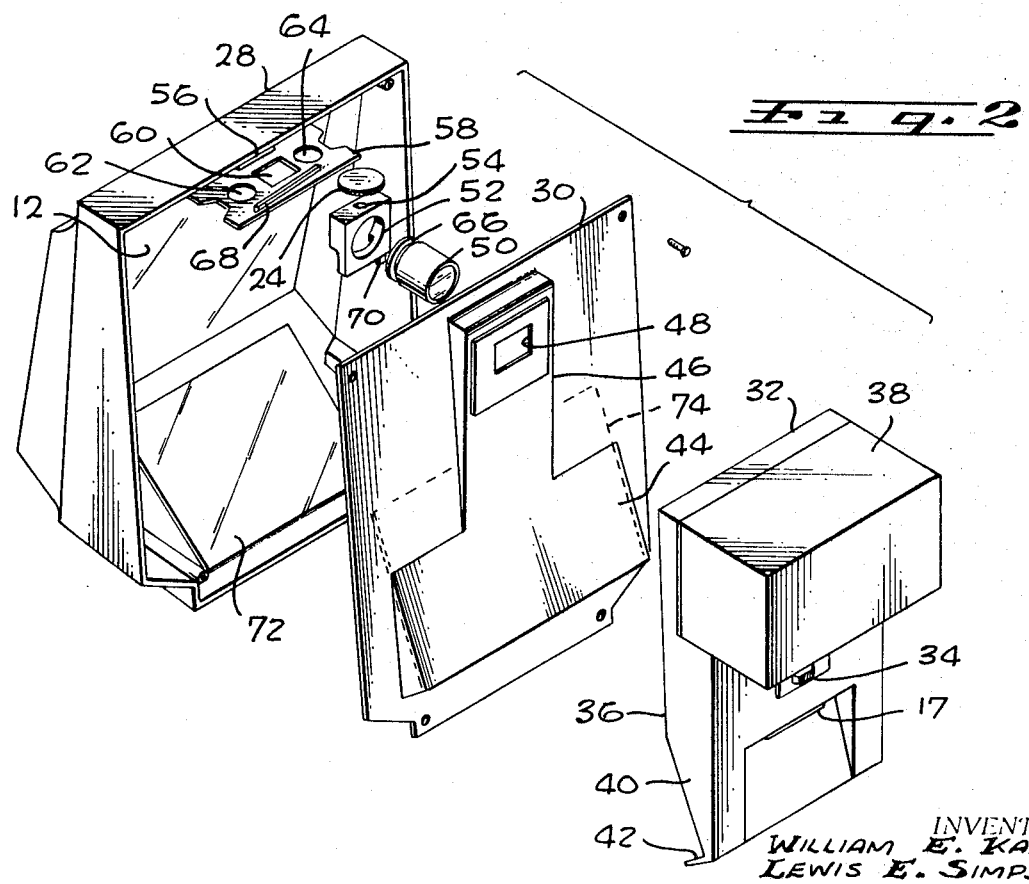
INVENTORS
WILLIAM E. KAROW
LEWIS E. SIMPSON
BY Lindenberg & Freilich
ATTORNEYS

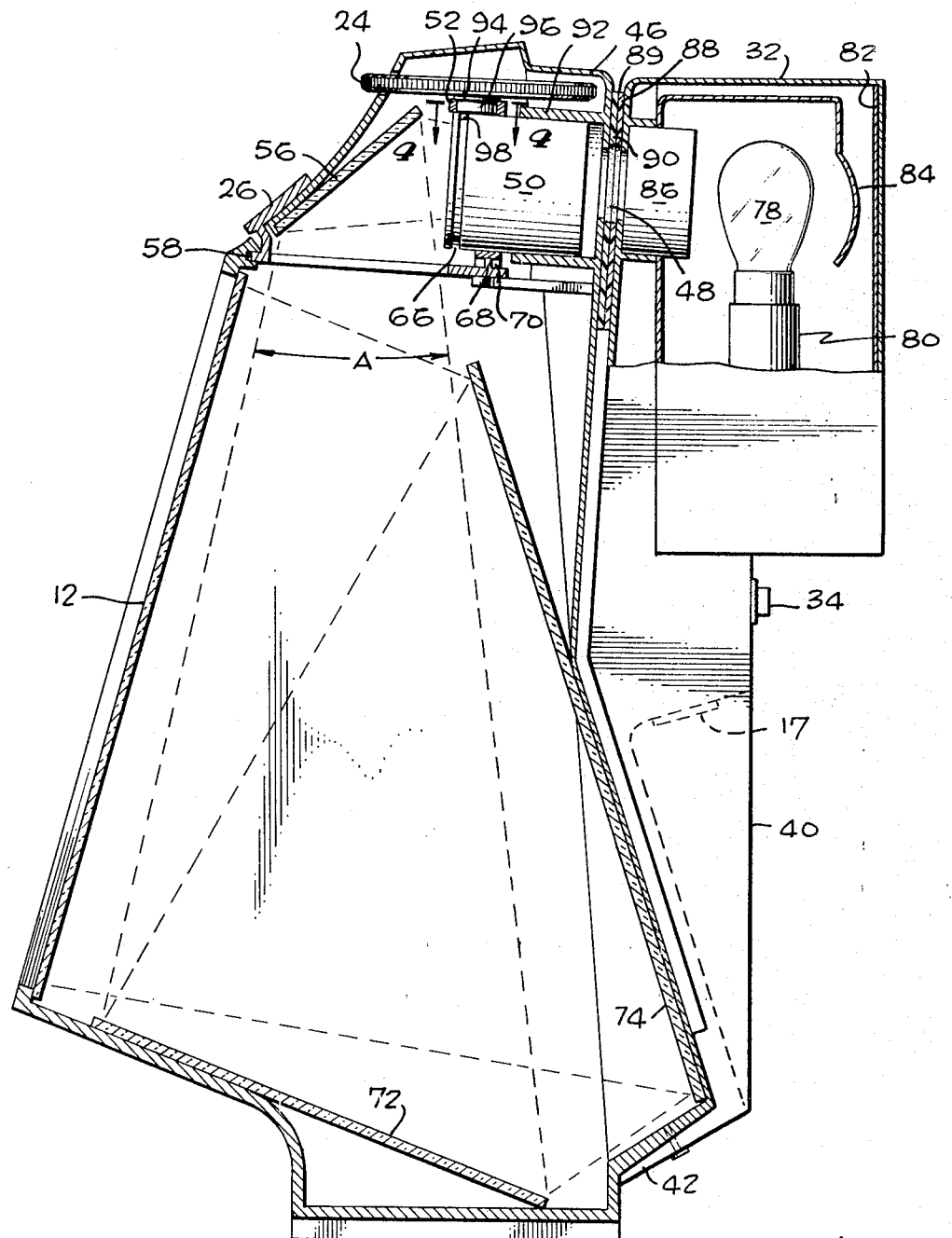

3,521,949
SMALL MICROFILM READER

William E. Karow, Los Angeles, and Lewis E. Simpson, Wilmington, Calif., assignors to Data Reproduction Systems, Inglewood, Calif., a corporation of California
Filed Sept. 21, 1967, Ser. No. 669,587
Int. Cl. G03b 21/28
U.S. Cl. 353—78                                        3 Claims

ABSTRACT OF THE DISCLOSURE

A microfilm reader of small size with a folded optical path wherein a microfilm-receiving slot is positioned near the top and rear of the reader to provide an optical path extending toward the front, down to the bottom, toward the back and thence toward the front to the viewing screen. A microfilm-holding plate mounted at the rear of the reader is spring biased toward the reader to enable the holding of microfilm without a carrier.

BACKGROUND OF THE INVENTION

This invention relates to apparatus for enlarging and displaying information on transparencies such as microfilm and microfiche.

Large quantities of printed material are available in the form of miniature transparencies, for example, as microfilm strips and rolls, microfiche cards, and cards having apertures containing microfilm reproductions. Such forms of printed information enable the sale of reproductions for a fraction of the cost of printed reproductions, and enable storage in a fraction of the space required for the storage of the usual paper reproductions. While miniature transparency reproductions offer great advantages, their general use is restricted by the availability of viewing devices which are generally referred to as microfilm readers.

A wide variety of microfilm readers is available; however, they are generally of large size and weight and relatively high cost. Furthermore, such readers have generally been limited to the reading of miniature transparencies of only one type, such as microfilm strips, or microfiche, unless a separate reader head or adapter is employed. A typical microfilm reader for roll or strip type film employs a large box-like structure containing a long optical path with a head, for holding the microfilm, located on the top or bottom of the device near the front thereof. Placing the head near the front in such readers is desirable to enable manipulation by a person viewing the screen; for example, it is difficult for a person to reach to the back of such large boxes. Reduction in the size of such readers is difficult because a long optical path is necessary, and a reader head at the top must be spaced a substantial distance from the bottom to provide a long optical path length, or else the reader must be very deep to add to the optical path length. It can be appreciated that such readers have been very bulky, resulting in large size and weight, high cost, and low portability.

Another type of reader used for reading microfiche, that is, sheets of transparent material on which are located many reduced sized pages of material, have utilized a carrier for holding the microfiche to move the different pages under the viewing aperture. The holder may be located at the bottom-front of the device, and the optical path extending from the bottom to a mirror at the top of the reader, to a mirror at the back and from thence to the viewing screen. These readers also are relatively bulky and expensive. A microfilm reader of simple construction and small size to enable low cost production, and which was adaptable for viewing miniature transparencies in a number of different forms would make an important contribution to the wide use of the transparency form of record and information storage.

SUMMARY OF THE INVENTION

This invention provides a microfilm reader of small size and simple construction adaptable for viewing transparencies in a number of different forms. The reader has a front which is almost entirely taken up with the viewing screen. In order to obtain small size, the viewing head portion, wherein the transparencies are inserted for reading, comprises a slot positioned at the top and near the rear of the reader. The optical path extends from a light source at the top-rear of the device, through the transparency and lens to a mirror at the top-front, down to a mirror at the bottom, to a mirror at the lower rear, and thence to the viewing screen. The area at the rear of the device is largely taken up with a mirror which reflects light directly onto the viewing screen. However, unlike previous devices generally available heretofore, the area at the top-rear of the reader that is above the last mirror, which space would normally be wasted, contains the light source and aperture for receiving the transparencies to be viewed.

The head portion for receiving the transparencies is in the form of a slot between two plates that are spring biased together. A microfiche or film strip portion inserted into the slot is pressed between the plates which hold it securely in position during viewing. The pressure is low enough so that insertion is readily made and the transparency can readily be moved around in the slot. Furthermore, the plates are covered with a soft material such as velvet to prevent damage to the transparencies as they are moved within the slot. Because of the small size of the viewer, realized partly through the unique optical path arrangement, the viewer has a small depth and a person can readily insert the transparencies in the slot and manipulate them while viewing the screen. In fact, the reader is of small enough size to be held on the lap in use.

Additional features of the invention include mechanisms for changing the magnification of the reproduction while maintaining sharp focus, for any focusing position at which the reader has been set.

A more complete understanding of the invention will be had from the following specification and claims, taken in conjunction with the accompanying drawings.

BRIEF DESCRIPTION OF THE DRAWINGS

FIG. 1 is a perspective view of a small microfilm reader constructed in accordance with the invention, and illustrating its use in viewing a microfiche transparency;

FIG. 2 is an exploded perspective view of the reader of FIG. 1;

FIG. 3 is a side sectional view of the reader of FIG. 1; and

FIG. 4 is a cross-sectional fragmentary plan view taken on the line IV—IV of FIG. 3.

DESCRIPTION OF THE PREFERRED EMBODIMENTS

FIG. 1 is a perspective view of an embodiment of the small microfilm reader of the invention. The reader comprises a housing 10 adapted to lie on a desk top or to be held in the lap, a viewing screen 12 at the front of the reader on which magnified reproductions are displayed, and walls forming a slot 14 for receiving transparencies to be viewed. The reader also includes a power cord 16 for supplying operating current to the reader to power the light source therein, and a transformer 18 for supplying current to the cord. The transformer 18 has a plug 20 for insertion in a household electrical outlet, and the transformer converts the relatively high voltages, such as 120 volts AC, to lower voltages such as 12 volts to substantially eliminate any electrical dangers which might arise from holding the small reader housing 10 on the lap during its use.

To use the reader, a power switch is operated to energize the light source, and the transparency to be viewed is inserted into the slot 14, a plate of microfiche identified at 22 being shown in the slot in FIG. 1. The image appearing on the screen 12 can be brought into optimum focus by turning a focus wheel 24. The magnification of the transparency can be changed, such as between three powers of magnification, by sliding a bar 26 at the front of the reader housing so that a pointer thereon is aligned with a magnification indication number. Change in magnification is accomplished without altering the optimum focus position, as will be explained below.

FIG. 2 is an exploded view of the reader, showing its construction. The housing 10 comprises a front housing portion 28, a rear panel 30 fitting over the back of the front housing portion, and a lamp housing portion 32 which attaches to the back of the rear panel 30. The power cord 16 plugs into a receptacle 17 in the rear of the lamp housing portion, and a power switch 34 is mounted on the lamp housing portion; the receptacle 17 and switch 34 are mounted on the lamp housing portion because the only power supplied to the reader is to the lamp. The lamp housing portion 32 has an elongated frame 36 which is attached at one end to a cover 38 within which the lamp is located, and which has a tapered end 40 with an angled tip 42. The angled tip 42 is attached by screws to the mirror enclosing protrusion 44 on the rear panel 30. The upper front of the lamp housing portion 32 lies against an aperture protrusion 46 of the rear panel 30. When the angled tip 42 is fastened to the protrusion 44, the tapered end 40 of the lamp housing portion 32 toward the aperture protrusion 46. Film placed between them is therefore held in place by friction. The film should be placed so that the part to be viewed is aligned with an aperture 48 in the aperture protrusion 46 through which light shines.

Light shining through the aperture 48 passes through an objective lens assembly 50 which is held in a lens bearing 52. The focus wheel 24 engages the objective lens assembly 50 through a hole 54 in the bearing, to enable it to move the lens assembly 50 back and forth for focusing, using an off center pin, to be described. Light passing through the objective lens assembly 50 is incident on a first mirror 56 which reflects the light downwardly. The light reflected downwardly passes through an opening in a relay lens holder 58. The holder 58 has a central aperture 60, a positive lens 62 and a negative lens 64, all three of which may be referred to as openings. The holder is mounted for sliding laterally, by lateral movement of the bar 26 to bring any one of the three openings under the first mirror 56. When the opening 60, which is devoid of any lens, is brought under the first mirror, a predetermined magnification such as seventeen times is obtained in the final viewed image. When the positive lens 62 is brought under the first mirror a smaller magnification such as thirteen times is obtained, and when the negative lens 64 is brought under the first mirror a larger magnification such as twenty-two times is obtained.

In order to bring a transparency into sharp focus, the focus wheel 24 is rotated to move the objective lens assembly 50 back and forth along the optical axis, by an off center pin engaged in a groove 66 on the lens assembly, as will be more fully explained. If the relay lens holder 58 were shifted to change magnification, without changing the position of the objective lens assembly 50, then the image at the new magnification would be out of focus. To retain focusing with shift in the lens holder, a focusing bar or cam 68 is provided on the holder 58. The focusing cam 68 engages pins 70 on the lens bearing 52. The focusing cam is positioned at an angle to the track along which the lens holder moves laterally, so that the part engaging the pins 70 moves the bearing 52 slightly back and forth along the optical axis as the relay lens holder 58 slides laterally. Accordingly, movement of the lens holder 58 to bring a new one of its three openings under the first mirror 56 causes the focusing cam 68 thereon to slide the lens bearing 52 back or forth, thereby moving the focus wheel 24 and the objective lens assembly 50 along the optical axis to retain sharp focusing.

Light passing from the first mirror 56 through one of the openings 60, 62 or 64 of the relay lens holder 58, is incident on second mirror 72. The second mirror 72 reflects the light to a third mirror 74 which reflects it against the back of the viewing screen 12. The viewing screen 12 is of a specially-coated glass or plastic which displays the image for viewing from the front of the reader.

FIG. 3 is a side sectional view showing the optical path and various mechanisms of the reader in greater detail. Current to power the lamp is received through the receptacle 17 into which an end of the power cord 16 is inserted. Operation of the power switch 34 connects current to a high intensity lamp 78, which is held in a lamp receptacle 80. A deflector 82 surrounds the sides of the lamp housing portion 32 and a reflector 84 is positioned behind the lamp 78 for concentrating the light therefrom to the front. Light from the lamp 78 and reflector 84 passes through a condenser lens assembly 86 which concentrates and directs the light through an aperture in the lamp housing portion. The light passes through apertures in a sheet of velvet 88 attached to the front of the lamp housing 32 and an aperture in a sheet of velvet 90 attached to the back of the aperture protrusion 46 on the rear panel 30. The light then passes through the objective lens assembly 50, against the first mirror 56, against the second mirror 72, against the third mirror 74 and against the back face of the viewing screen 12. A transparency to be viewed, such as a strip of microfilm or a sheet of microfiche is inserted between the sheets of velvet 88 and 90. The spring action of the tapered beam 40 of the lamp housing portion causes the lamp housing to spring back slightly to accomodate the transparency, and hold it in place by slight frictional forces. In the case of thin transparencies, the elasticity of the velvet may be sufficient to provide a slot opening to receive the transparency.

In order to bring the image on the transparency in sharp focus on the viewing screen, the objective lens assembly 50 may have to be moved back and forth along the optical axis a slight amount. The objective lens assembly 50 is slidably held in a tube 92 formed on the aperture protrusion 46. The lens assembly 50 is also slidably held in the lens bearing 52. The position of the focusing cam 68 depends on the relay lens holder 58. Thus for a given lateral position of the lens holder 58, the position of the bearing 52 along the optical axis is fixed. The position of the objective lens assembly 50 relative to the lens bearing 52 is determined by the rotative position of the focus wheel 24. The focus wheel 24 has a hub portion 94 which rests on the top of the lens bearing, a journal 96 engaged with the walls of the hole 54 in the lens bearing, and a pin 98. The pin 98 is positioned off center from the journal 96 and is engaged in the groove 66 of the objective lens assembly. As the focus wheel 24 is turned, the pin 98 moves the lens assembly 50 back or forth axially along the optical axis.

The position of the objective lens assembly 50 is therefore determined by the position of the focus wheel 24 and by the lateral position of the relay lens holder 58. The angle or angles at which the focusing cam 68 is positioned relative to the direction of movement of the relay lens holder 58 is carefully chosen. The angles are so chosen that the amount by which the lens bearing 52 is moved back or forth along the optical axis when the relay lens holder is laterally shifted, just sufficient to compensate for the difference in magnifying powers (or reducing powers) of the opening 60, the positive lens 62, and the negative lens 64. The positive lens 62 which provides a smaller image, requires that the objective lens assembly 50 be moved backward toward the lamp housing, while the negative lens 64 requires that the objective lens assembly be moved toward the first mirror 56. For any given position of the focus wheel 24, the predetermined corrections imparted by the focusing cam 68 do not interfere with sharp focusing. Thus, the correction for different lenses on the relay lens holder can be made without requiring a turning of the focus wheel, and the viewer is easily operated.

The design of the microfilm reader of this invention enables economical production due to the simplifications in design, and provides for small size and very easy use. Instead of the usual, complicated, carrier apparatus for holding the transparencies, the simple beam 40 and elasticity of the velvet coverings is utilized to press the two aperture structures together so that the transparency can be held by friction forces between the velvet sheets 88 and 90. The insertion of the transparencies is extremely simple, inasmuch as it requires merely the insertion of the edge thereof into the slot formed between the two sheets of velvet 88 and 90. Furthermore, movement of the transparencies can be done by hand, instead of requiring the manipulation of a complex carrier apparatus.

Extreme compaction of design is achieved by placing the lamp 78 at the back of the reader. The third mirror 74 has a position which requires a substantial base depth of the reader at the bottom thereof, but which does not require such a depth at the top. Instead of wasting the spuace above the third mirror 74, the lamp 78 is placed at the upper-back portion of the reader, and the optical path is extended by locating a portion of it between the front of the optical reader, at the first mirror 56, and back portion at the lamp 78. Thus, at least a portion of the light source, especially the condenser lens assembly 86 and also the station at which the microfilm is received, namely the slot 89 between the velvet sheets, is positioned above the third mirror 74. This layout can be compared with a typical reader wherein the lamp is placed at the top of the reader and the first portion of the optical path is straight down toward the mirror 72 at the bottom of the reader. Such an alternate arrangement used in previous readers would result in a very tall microfilm reader which was more difficult to use and more expensive to construct. The positioning of the lamp toward the rear, which enables the station at which the transparencies are received to be positioned at the top and near the rear of the reader, provides particular convenience. This arrangement is especially convenient because it allows the operator to see the transparency that he is manipulating at the same time that he views the enlarged image on the viewing screen. The arrangement of this invention also provides a relatively long optical path, and uses a narrow beam spread with an angle A of the optical path of approximately 22°, which enables clear magnification with lens system of only moderate quality.

Microfilm readers have been constructed in accordance with the above description using a viewing screen 12 of 5½ inches height and an optical path between the slot 89 and the screen of approximately 15 inches. These readers have provided sharp images in a device of small size and low weight, which was very simple to use.

What is claimed is:
1. Apparatus for viewing transparencies comprising:
a mirror housing having front, rear, upper and lower portions, and having a viewing screen at the front portion, mirror means for reflecting light received at the upper-rear portion along an optical path onto said screen, and lens means disposed along said optical path for forming an image on said screen;
lamp apparatus for providing light to said mirror housing including a lamp housing disposed at the upper-rear portion of said mirror housing; and
a holding bracket for biasing said lamp housing against said mirror housing;
said lamp and mirror housings having walls forming a slot at the region where they are biased together, to receive and frictionally hold in position a sheet of microfilm.

2. The apparatus described in claim 1 wherein:
said holding bracket extends between a position on said lamp housing which is in back of said slot, to a position on said mirror housing below said lamp housing, to leave a space below said slot for receiving part of a plate of microfilm.

3. Apparatus for viewing transparencies comprising:
a mirror housing;
a viewing screen mounted on said mirror housing;
a light source for providing light that can move along an optical path onto said screen;
mirror means in said mirror housing for reflecting light from said light source along said optical path onto said screen;
a lens assembly disposed along said optical path;
lens bearing means engaged with said lens assembly for restricting it substantially to movement along said optical path;
focusing wheel means for moving said lens assembly relative to said lens bearing means along said optical path;
lens holder means containing a plurality of openings for providing a plurality of magnifications of images at said screen, at least one of said openings having a lens therein;
means for moving said lens holder means substantially perpendicular to said optical path for bringing a selected opening thereof into said optical path; and
means for coupling said lens holder means to said focusing wheel means for moving said focusing wheel means along said optical path as said lens holder means moves substantially perpendicular to said optical path, whereby to maintain sharp focusing for a plurality of magnificaitons.

References Cited
UNITED STATES PATENTS

| | | | |
|---|---|---|---|
| 3,241,439 | 3/1966 | Kiner | 353—101 |
| 2,782,680 | 2/1957 | Howell | 353—78 |
| 2,633,774 | 4/1953 | Rounsefell | 353—78 |
| 2,404,189 | 7/1946 | Place | 353—79 |
| 3,369,450 | 2/1968 | Peters | 353—27 |

SAMUEL S. MATTHEWS, Primary Examiner